United States Patent
Wolfe

(10) Patent No.: US 7,248,950 B2
(45) Date of Patent: Jul. 24, 2007

(54) FOG TESTER APPARATUS

(75) Inventor: Richard Wolfe, Londonderry, NH (US)

(73) Assignee: Kollsman, Inc., Merrimack, NH (US)

( * ) Notice: Subject to any disclaimer, the term of this patent is extended or adjusted under 35 U.S.C. 154(b) by 503 days.

(21) Appl. No.: 10/921,357

(22) Filed: Aug. 12, 2004

(65) Prior Publication Data

US 2005/0228551 A1    Oct. 13, 2005

Related U.S. Application Data

(60) Provisional application No. 60/494,640, filed on Aug. 12, 2003.

(51) Int. Cl.
  *G05D 1/00*    (2006.01)
  *G09B 9/08*    (2006.01)
(52) U.S. Cl. .......................... 701/10; 434/36
(58) Field of Classification Search .............. 701/1–16; 434/36

See application file for complete search history.

(56) References Cited

U.S. PATENT DOCUMENTS

| | | | | |
|---|---|---|---|---|
| 3,675,344 A | * | 7/1972 | Williams | 434/36 |
| 4,313,726 A | * | 2/1982 | Chase | 434/42 |
| 4,419,731 A | * | 12/1983 | Puffett | 701/16 |
| 5,894,272 A | * | 4/1999 | Brassier et al. | 340/602 |
| 2002/0109872 A1 | * | 8/2002 | Hart | 359/35 |

* cited by examiner

*Primary Examiner*—Matthew Luu
(74) *Attorney, Agent, or Firm*—William B. Ritchie

(57) ABSTRACT

A testing apparatus for determining the enhanced vision capabilities of a system that is designed to assist a pilot in detecting lights and ground features in night and low visibility conditions. One embodiment of the apparatus is suitable for laboratory or production facilities, the other embodiment is used for the flight line by installing it in the aircraft. A simulated pattern is presented by the apparatus wherein the enhanced vision system (EVS) can be calibrated. Further, fog can also be simulated over the spectral band of the EVS. Runway landing lights are also able to be simulated using a readily available light source.

2 Claims, 2 Drawing Sheets

Figure 1 –

FOG TESTER APPARATUS

This application claim benefit of priority under 35 U.S.C. §119(e) to U.S. Provisional Application Ser. No. 60/494,640 filed on Aug. 12, 2003.

FIELD OF THE INVENTION

This invention relates to testing equipment and methods, in particular, an apparatus that can be used to test the fog-penetrating capability of infrared visibility improvement systems for aircraft. The apparatus can be used for either a lab/production facility or for the flight line when it is installed in the aircraft.

BACKGROUND OF THE INVENTION

In order to increase safety in night and low visibility flying conditions, equipment has been developed, such as the Kollsman Enhanced Vision System (EVS), which assists the pilot in detecting lights and ground features such as runways, buildings and other aircraft. This added ability enables the aircraft to be landed in lower minimal landing conditions, improves flight safety and increases pilot situational awareness.

Basically, this system consists of a Forward Looking IR (FLIR) Sensor, an electronics processing box and an infrared window installed in the aircraft radome. Video processing software algorithms display an infrared image of the approaching lights, runways, taxiways, as well as other structures such as buildings, ground vehicles, lighted and unlighted aircraft, terrain, etc. The image is displayed to the pilot via any raster capable Head-Up Display (HUD) or a head-down display such as a Cathode Ray Tube (CRT).

In order to properly evaluate the operational characteristics of this type of device, a special tester is required that is not found with currently available devices. An on-aircraft tester is required if this evaluation is to be conducted on the aircraft rather than in a lab or production facility.

SUMMARY OF THE INVENTION

It is an aspect of the invention to provide a fog test apparatus that has the capability to measure fog-penetrating ability of an EVS over the entire wide field of view provided by the EVS.

Another aspect of the invention is to provide an apparatus that can be calibrated such that a properly operating EVS is able to detect and display the simulated pattern on the HUD or head-down display.

It is another aspect of the invention to provide a fog tester apparatus that can emulate fog conditions over the spectral band of the EVS.

Still another aspect of the invention is to provide a fog tester apparatus which contains a light source which emulates runway landing lights.

It is an aspect of the invention to provide a fog tester apparatus that quantitatively measures infrared transmissions at emulated fog conditions at predetermined distances from the source (typically the runway)

These aspects of the invention are not meant to be exclusive and other features, aspects, and advantages of the present invention will be readily apparent to those of ordinary skill in the art when read in conjunction with the appended claims and accompanying description.

DETAILED DESCRIPTION OF THE INVENTION

Figure 1:
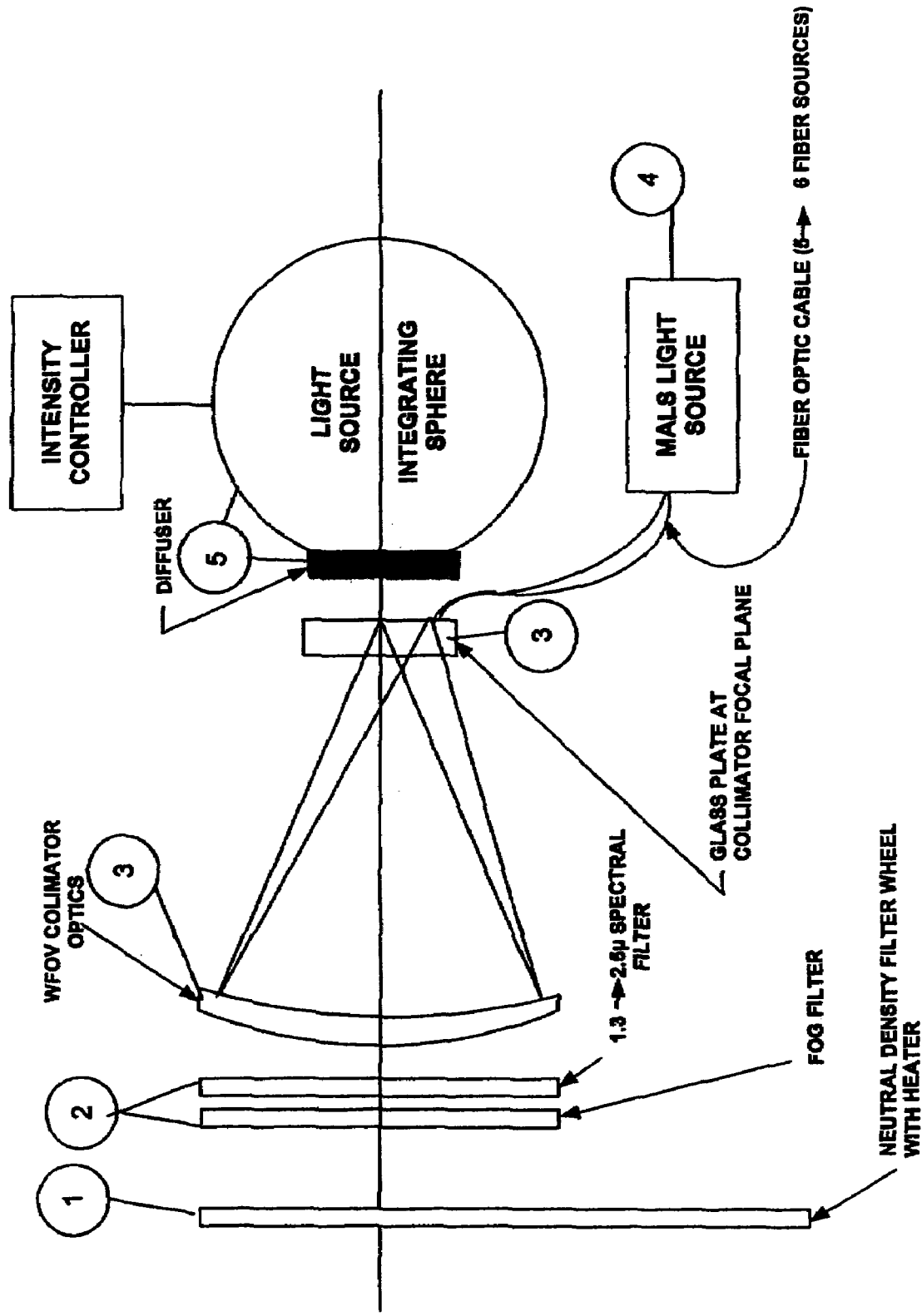
FIG. 1 is an illustration of the fog tester apparatus in accordance with the invention for the lab testing embodiment.

As shown in FIG. 1, the major components of invention are illustrated. All components are commercially available and were modified to meet specific Field of View and bandpass (frequency) requirements of the EVS. The fog filter attenuation was derived from data obtained from NASA. The MALS light source is a standard commercial item from General Electric Corporation. The infrared transmissions are in the spectral filter bands of 1.3 to 2.5 microns. Neutral density filter wheel 1 has five distinct filters. Each filter represents the intensity of the landing lights, which represents the increasing distances beyond the minimum detection area of the Runway Visible Range (RVR).

The infrared transmissions are in spectral filter bands of 1.3 to 2.5 microns. Wheel 1 is able to be heated by an external source to 10° C. above the ambient temperature. The spectral filter transmission is preferably about 39.76%, −0.0%, +5.0%. The filters are used to simulate fog transmission from a minimum specified range to +4 second in flight range.

Fog filter 2 preferably has an average transmission of about 65%, from 1.3 to 2.5 microns.

Wide-field-of-View (WFOV) collimator 3 has an FOV sufficient to cover the EVS sensor FOV (22.5 vertical×32 horizontal). The FOV is preferably circular (about 40 degrees in diameter). Collimator 3 is preferably the type made by Ophir of Israel. Although, other collimators having similar performance characteristics could be substituted.

Medium Intensity Approach Light Source (MALS) light source 4 are typical of those on airport runways. Pinholes, with an angular sub tense representing a MALS light @2 RVR is located at the WFOV collimator focal plane. These cables emulate five to six light sources at the plate, thus emulating a series of runway lights. The spacing of these 5 sources on the plate is 3.4 milli-radians apart.

Diffuser and integrating sphere 5 such as made by Labspheres of Littleton N.H. is used to provide a uniform background over the required FOV. The density of the background can be controlled by the operator.

Figure 2:
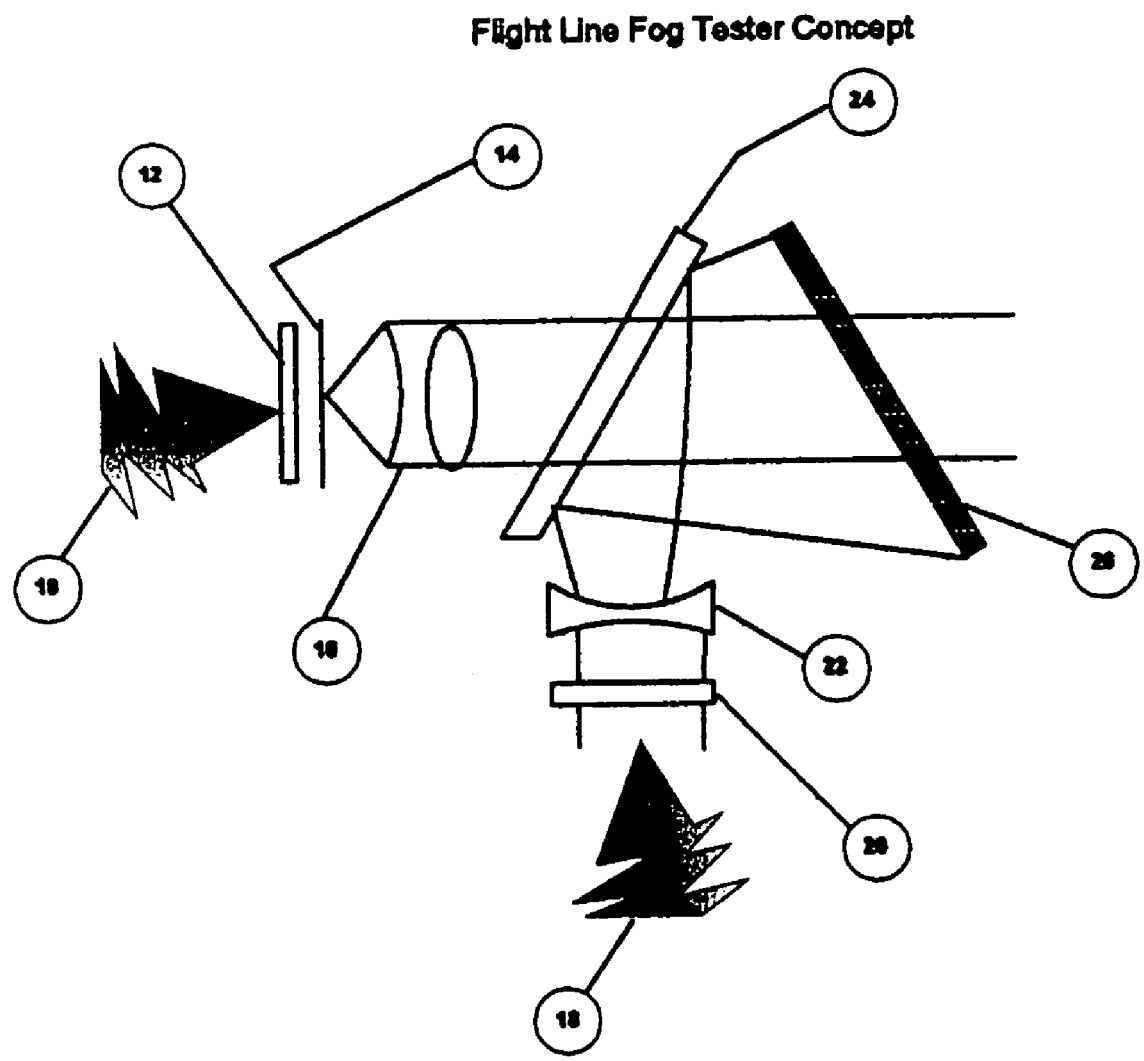
FIG. 2 is an illustration of the illustration of the flight line fog tester embodiment.

The flight line components are shown in FIG. 2. In this embodiment, the invention in installed in an aircraft.

All components are commercially available and were modified to meet specific Field of View and band pass (frequency) requirements of the EVS. The fog filter attenuation was derived from data obtained from NASA. The MALS light source is a standard item from the General Electric Corporation. The infrared transmissions are in the spectral filter bands of 1.3 to 2.5 microns.

Medium Intensity Approach Light Sources (MALS) light Sources (10) are typical of those used on airport runways.

The light is brought by fiber optic bundle (part of item 10) to the Diffuser/Pin Hole Source (12). This forms the light bundle into an object (series of dots) which forms the test pattern. Pinholes, with an angular sub tense representing a MALS light are located at the focal plane of the collimator.

Typical spacing of the pinholes will be equivalent to that of a 1200 ft runway visible range (RVR) and 200 ft. Decision height.

The Achromatic Objective Lens (16) collimates the light pattern. It has a field of view sufficient to cover the EVS field of view (32 degrees horizontal and 22.5 degrees vertical).

The Solar Light Source (18) acts as a background source simulating the solar spectrum and intensity.

The Solar Filter/Diffuser (20) provides uniformity to the solar background.

The Negative Lens (22) dispenses the radiation over the EVS field of view.

The Beam Splitter (24) combines the Solar Background with the MALS objects and superimposes these into the EVS.

The Simulated Fog Filter (26) will be designed such that its transmittance will be equivalent to viewing the runway light source at 1200 feet RVR and a decision height of 200 ft. A single Simulated Filter is provided.

Although the present invention has been described with reference to certain preferred embodiments thereof, other versions are readily apparent to those of ordinary skill in of the preferred embodiments contained herein.

What is claimed is:

1. A laboratory testing apparatus for testing the fog-penetrating capability of an infrared visibility improvement system used in aircraft, said apparatus comprising:
    a light source for illuminating said apparatus, wherein said light source represents the medium intensity approach light that is found on aircraft runways;
    a neutral density filter wheel having a plurality of filters that represent the intensity of landing lights at varying distances;
    a heater associated with said filter wheel for heating said filter wheel above ambient temperature;
    a fog filter adjacent to said filter wheel;
    a wide field of view collimator interposed between said fog filter and said light source;
    wherein said collimator has a field of view sufficient to cover the enhanced vision system sensor of said system;
    a glass plate positioned at the focal plane of said collimator;
    wherein said collimator further comprises a plurality of pinholes to emulate multiple light sources at said glass plate;
    a diffuser and integrating sphere, controllable by an operator, for controlling the density of a background;
    such that said apparatus is able to determine the fog-penetrating ability of the enhanced vision system over the entire wide field of view provided by said system.

2. A testing apparatus for testing the fog-penetrating capability of an infrared visibility improvement system in an aircraft, said apparatus comprising:
    a MAL light source for illuminating said apparatus, wherein said light source represents the medium intensity approach light that is found on aircraft runways;
    a fiber optic bundle that transmits the light from said light source;
    a diffuser and pinhole source optically connected to said light source by said fiber optic bundle which provides a plurality of dots that comprise the light test pattern;
    an achromatic objective lens collimates the light test pattern, wherein the pattern has a field of view sufficient to cover the enhanced vision system of the aircraft;
    a solar light source which serves to provide a background source simulating the solar spectrum and intensity;
    a solar filter diffuser optically connected to said solar light source wherein said diffuser provides uniformity to the solar background provided by said solar light source;
    a negative lens adjacent to said diffuser which dispenses the radiation over the enhanced vision system field of view;
    a beam splitter which combines the solar background provided by said solar light source with the light test pattern wherein said combined light signal is delivered into the enhanced vision system of said aircraft;
    a fog filter that provides a transmittance that is equivalent to viewing a runway light source at 1200 feet RVR and at a decision height of 200 feet, such that the capability of the infrared visibility improvement system of said aircraft is thus determined;
    a wide field of view collimator interposed between said fog filter and said light source;
    wherein said collimator has a field of view sufficient to cover the enhanced vision system sensor of said system;
    a glass plate positioned at the focal plane of said collimator;
    wherein said collimator further comprises a plurality of pinholes to emulate multiple light sources at said glass plate;
    a diffuser and integrating sphere, controllable by an operator, for controlling the density of the background;
    such that said apparatus is able to determine the fog-penetrating ability of the enhanced vision system over the entire wide field of view provided by said system.

* * * * *